United States Patent [19]

Bird

[11] Patent Number: 5,157,572
[45] Date of Patent: Oct. 20, 1992

[54] APPARATUS SUITABLE FOR USE IN PROTECTING ELECTRICAL INSTALLATIONS FROM TRANSIENTS

[75] Inventor: Anthony O. Bird, Nottingham, United Kingdom

[73] Assignee: W. J. Furse & Co. Ltd., United Kingdom

[21] Appl. No.: 659,386

[22] PCT Filed: Sep. 1, 1989

[86] PCT No.: PCT/GB89/01024

§ 371 Date: Apr. 1, 1991

§ 102(e) Date: Apr. 1, 1991

[87] PCT Pub. No.: WO90/03058

PCT Pub. Date: Mar. 22, 1990

[30] Foreign Application Priority Data

Sep. 7, 1988 [GB] United Kingdom ............... 8820953

[51] Int. Cl.$^5$ .................................................. H02H 3/22
[52] U.S. Cl. ........................................... 361/56; 361/111; 361/120; 361/127
[58] Field of Search ............... 361/56, 118, 120, 111, 361/91, 127

[56] References Cited

U.S. PATENT DOCUMENTS 3,816,802  6/1974  Crask et al. ..................... 361/120
4,677,518  6/1987  Hershfield ........................ 361/56

FOREIGN PATENT DOCUMENTS 0392378  1/1923  Denmark .
0024585  8/1980  European Pat. Off. .
0092052  10/1983  European Pat. Off. .
0173018  5/1986  European Pat. Off. .
0252493  1/1988  European Pat. Off. .
2609580  7/1988  France .
1285283  8/1972  United Kingdom .
2175156  11/1980  United Kingdom .
1594313  7/1981  United Kingdom .

*Primary Examiner*—A. D. Pellinen
*Assistant Examiner*—S. Jackson
*Attorney, Agent, or Firm*—Poms, Smith, Lande & Rose

[57] ABSTRACT

An apparatus for protecting electrical installations against transients includes one or more devices comprising a network of varistors connected through a gas discharge tube to live, earth and neutral conductors. The varistors each have a terminal connected to an associated pole of the tube and the other terminal to the associated conductor. The apparatus may have three devices connected in cascade and preferably, inductances connected in series in the live and neutral conductors between the devices and the load. Preferably, varistors interconnect the conductors between the inductances and load. Relatively cheap and efficient apparatus for discharging transient over-voltages is provided.

10 Claims, 5 Drawing Sheets

APPARATUS SUITABLE FOR USE IN PROTECTING ELECTRICAL INSTALLATIONS FROM TRANSIENTS

TECHNICAL FIELD

This invention is concerned with apparatus suitable for use in protecting electrical installations from transients, especially mains power installations.

BACKGROUND ART

Electrical transients on known power circuits are a major cause of problems especially in sensitive electronic equipment. The higher the voltage level of an electrical transient which reaches equipment to be protected, the more likely the equipment is to be damaged or adversely affected by the transient; for example, on 240 volt A.C. mains supply, transient over voltages can be caused by switching, remote lightning strikes and the like. The mains supply may carry transient over voltages of as much as 10 kilovolts, for example, and it is necessary to ensure that the over voltage which reaches the load equipment is reduced substantially, preferably below 1000 volts, suitably below 700 volts.

Various proposals have been made to protect installations against transient over voltages but these have often been expensive and/or not altogether effective: for example in some proposed protective apparatus, a leakage of a small current from the live conductor to earth may occur, which is undersirable. A voltage dependent resistor, known as a varistor, rated for operation on 240 volt mains will leak a steady-state current of less than 1 mA. However whilst diverting a 1 kA transient the varistor will develop in excess of 900 volts across its terminals. A varistor (or combination rated in total for 190 volt A.C. will develop only about 620 volts for the same transient.

Although the 190 volt rated component clearly offers better protection, it cannot be used on 240 volt mains since the steady-state leakage current would lead to over-heating and destruction of the varistor.

It has been proposed to protect electrical equipment against electrical transients by devices including gas discharge tubes and voltage dependent resistors. For example GB2175156A describes one such apparatus but in this apparatus voltage dependent resistors are connected directly between the live and neutral supply leads and, therefore, will suffer from current leakage as outlined above, or provide poor protection against live/neutral transients. Furthermore, the protection against transients occurring between live and neutral conductors is relatively ineffective, relying on the voltage dependent resistors. U.S. Pat. No. 4,677,518 describes another such apparatus but this is designed to give protection between only two conductors (live and neutral) and no direct protection between live and earth nor between neutral and earth conductors is envisaged.

DISCLOSURE OF THE INVENTION

One of the objects of the present invention is to provide improved protection to mains power equipment against electrical transients.

Another object of the invention is to provide apparatus effective to reduce large amplitude transients to a low level.

In one aspect the invention may be considered to provide a device suitable for use in protecting electrical installations from transients comprising a network including voltage dependent resistors connected to live, earth and neutral conductors, and a gas discharge tube disposed so that there can be no connection between the live conductor and the neutral and earth conductors other than through the gas discharge tube.

In preferred embodiments, the gas discharge tube is connected with the live conductor either directly or via a voltage dependent resistor but there is no connection between live and earth or live and neutral conductors, within the device, other than through the gas discharge tube.

In a device in accordance with the invention the spark-over level of the gas discharge tube (the voltage at which it becomes conductive) represents the minimum let-through voltage of the device i.e. transients smaller than the spark-over voltage will not be attenuated by the device. This voltage is preferably less than 600 Volts, more preferably about 500 volts.

Gas discharge tubes may be from any suitable source. Suitable tubes are supplied by Beswick, device 37/range; peak current handling 10 kA, for 8/20 us waveform.

In the preferred devices the construction is such that the device has varistors between each of the conductors to which the device is to be connected.

In one preferred device in accordance with the invention the gas discharge tube is a multipole, suitably a threepole gas discharge tube having a number of poles corresponding with the number of conductors in the electrical supply to which it is to be connected, each pole having a terminal of a varistor connected to it, the other terminal being adapted to be connected to an associated one of the conductors: thus the threepole device has poles associated respectively with live, earth and neutral conductors in a single phase supply.

In a further device in accordance with the invention the network is a star network comprising a plurality of varistors, one associated with each conductor, having one terminal connected in common and the other terminal connected to the associated one of the conductors, the or each varistor associated with a live conductor being connected to a pole of the gas discharge tube, another pole of which is connected to the live conductor.

In another device in accordance with the invention the network comprises a varistor connected between the neutral and earth conductors, a varistor or varistors connected between earth and a pole of the or each gas discharge tube, and a varistor or varistors connected between neutral and a pole of the or each gas discharge tube. Suitably the varistor or varistors connected between the earth and neutral conductors respectively, and a pole of the or each gas discharge tube are connected to the same pole of the gas discharge tube. Alternatively, the, or each, gas discharge tube may have three poles, one of which is connected to the associated live conductor and the two others of which are, respectively, connected to the varistor connected to the earth conductor and the varistor connected to the neutral conductor.

In preferred devices in accordance with the invention the total voltage rating of the varistor or varistors connected between the live and earth conductors, and the total voltage rating of the varistor or varistors connected between the live and neutral conductors is sufficiently high that, after a transient voltage has passed, the discharge tube ceases to conduct.

In a device in accordance with the invention in which the discharge tube has two poles the total voltage ratings of the varistors connected directly between the earth and neutral conductors is preferably substantially equal to the root mean square voltage applied between the live and neutral conductors.

In another aspect the invention may be considered to provide apparatus suitable for use in protecting electrical installations comprising a plurality of devices in accordance with the invention.

A prefered apparatus in accordance with the invention comprises one or more devices in accordance with the invention as set out in the preceding paragraphs, inductances connected in series in the live and neutral conductors between the device or devices and the load, and a varistor connecting the live and neutral conductors positioned between the inductances and the load; a preferred apparatus also further comprises varistors connected between the earth conductor and the live and neutral conductors at a position between the respective inductances and the load of a voltage rating sufficiently high to prevent any significant current leakage in normal operation of the equipment.

To protect either single or multiphase electrical supplies devices or apparatuses in accordance with the invention may be used. For multiphase supplies the neutral and earth conductors will conveniently be common for all phases and a device (or an apparatus) in accordance with the invention will be associated with each live (phase) conductor.

BRIEF DESCRIPTION OF DRAWINGS

There now follows a detailed description to be read with reference to the accompanying drawings of apparatus embodying the invention suitable for use in protecting electrical installations from transients, each comprising a device itself embodying the invention in another of its aspects. It will be realised that this apparatus and these devices have been selected for description to illustrate the invention by way of example.

In the accompanying drawing.

BEST MODES FOR CARRYING OUT THE INVENTION

The apparatuses embodying the invention described hereinafter are all suitable for use in protecting electrical installations connected to an a.c. mains power supply and comprise one or more devices suitable for use in protecting electrical installations from transients described hereinafter with reference to one of FIGS. 1, 3, 4 and 5. Each of these devices comprises a network oof voltage dependent resistors, herein referred to as "varistors", connected through a gas discharge tube to live, earth and neutral conductors, the gas discharge tube being associated with the live conductor.

Figure 1:
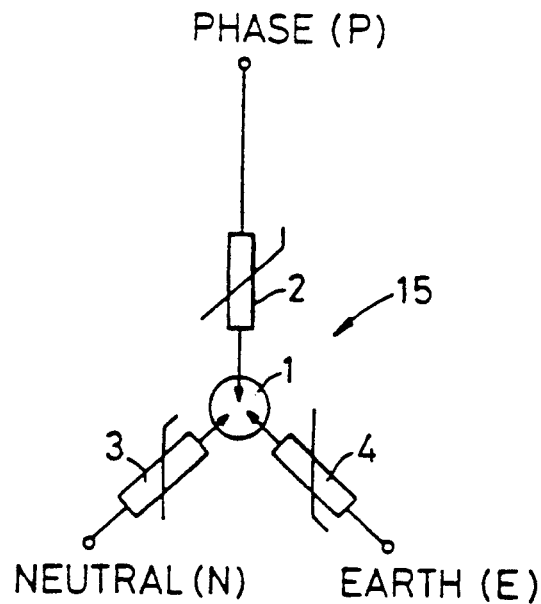
FIG. 1 is a diagramatic view of a preferred device suitable for use in apparatus embodying the invention.

The first, preferred, illustrative device 15, shown in FIG. 1, comprises a multi-pole, namely a three pole, gas discharge tube 1 and three varistors 2, 3, 4 each having one terminal connected to one pole of the discharge tube 1 and the other terminal adapted to be connected with an associated one of the conductors P, N, E, as indicated in FIG. 1.

Figure 3:
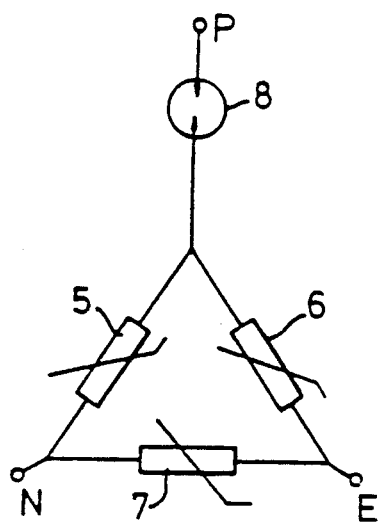
FIGS. 3, 4 and 5 are diagramatic views of second, third and fourth devices suitable for use in apparatuses embodying the invention.

The second device shown in FIG. 3 comprises a delta network having three varistors 5, 6, 7. The varistor 7 is arranged to be connected between the neutral and earth conductors N, E whilst the varistors 5, 6 have one terminal connected, respectively, to neutral and earth conductors N, E and their other terminals connected in common and connected to one pole of a two pole gas discharge tube 8, the other pole of which is arranged to be connected to the live conductor P.

The third device also comprises a type of delta network including three varistors 5, 6, 7 and a gas discharge tube 1. The gas discharge tube 1 has three poles and is similar to that used in the first device. One of the poles in connected to the live conductor P whilst one of the other poles in connected to a terminal of the varistor 5 and the final pole is connected to a terminal of the varistor 6 the other terminals of which are connected respectively to the neutral and live conductors N, E; the final varistor 7 is connected between the neutral and earth conductors N, E.

Figure 5:
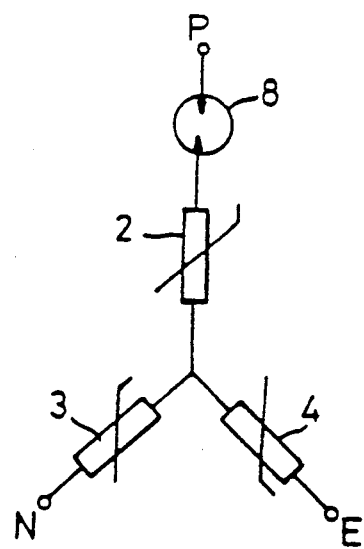

The fourth deivce, shown in FIG. 5, is a star network comprises a plurality of varistors 2, 3, 4 one associated with each conductor P, N, E respectively. The varistors each have one terminal connected in common and the other terminal connected to an associated one of the conductors P, N, E. The varistor 2 is associated with the live or phase conductor P, the varistor 3 with the neutral conductor N and the varistor 4 with the earth conductor E. The varistor 2 associated with the live conductor P is connected to one pole of a two pole gas discharge tube similar to the tube 1 of the second device; the other pole is connected to the live conductor.

Each of the devices shown in FIGS. 1, 3, 4 and 5 is intended for use in protecting load installations from electrical transients on a 240 volt A.C. mains supply; however, similar devices may be used in connection with A.C. supplies arranged to operate at different voltages provided that the components of the devices are appropriately selected.

In the devices shown in the drawings the gas discharge tubes 1, 8 are of a type which is arranged to become conducting when the potential difference between the poles exceeds a pre-selected level, in the illustrative devices 500 volts.

After a transient has been discharged through the array of discharge tube 1; 8 and varistors 2, 3, 4; 5, 6, 7 the tube 1; 8 must cease to conduct: thus the varistors 2, 3, and 2, 4 in the first and fourth devices and the varistors 5, 6 in the scond and third must be chosen such that at peak mains voltage they leak a current less than that required to maintain the discharge tube 1, 8 in a conductive state. In the illustrative devices this leakage current must be less than 1 amp at peak mains voltages. Thus the voltage ratings of any varistor, or combination of varistors adapted to be connected between live and neutral or live and earth via the gas discharge tube must not be rated below a minimum voltage rating dependent on the maximum acceptable leakage current. In the illustrative devices this minimum voltage rating is 180 V.r.m.s.

The current ratings of all the varistors used in the illustrative devices is 6.5 kA for an 8/20 us test waveform (i.e. a rise time to peak of 8 us and a time to half peak current of 20 us). However, varistors with different current ratings could be used, if desired. The Siemens S20K range of varistors are suitable.

Figure 4:
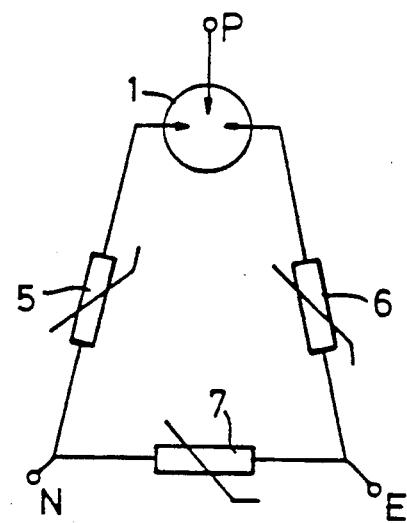

In the device shown in FIGS. 1 and 5 the sum of the voltage ratings of the varistors 2 and 3 and the varistors 2 and 4 is selected to be about 190 volts; for example varistor 2 could be rated at 60 volts and varistors 3 and 4 at 130 volts or varistors 2, 3 and 4 at 95 volts. Likewise the ratings of each of the varistors 5, 6 in the devices shown in FIGS. 3 and 4 is suitably about 190 volts. The varistors connected between earth and neutral conductors should not conduct a large current if there is a fault, for example a short, between the live conductor P and one of the earth or neutral conductors E, N. Thus, in those devices (FIGS. 3 to 5) where varistors between neutral and earth are not connected via the discharge tube, but directly, preferably the total voltage ratings of the varistors connected between the earth and neutral conductors is substantially equal to the root mean square voltage applied between the live and neutral conductors P, N. In the device shown in FIG. 5 the sum of the voltage ratings of varistors 3, 4 is 260 volts and, in the devices shown in FIGS. 3 and 4 varistor 7 is rated at 260 volts.

Figure 6:
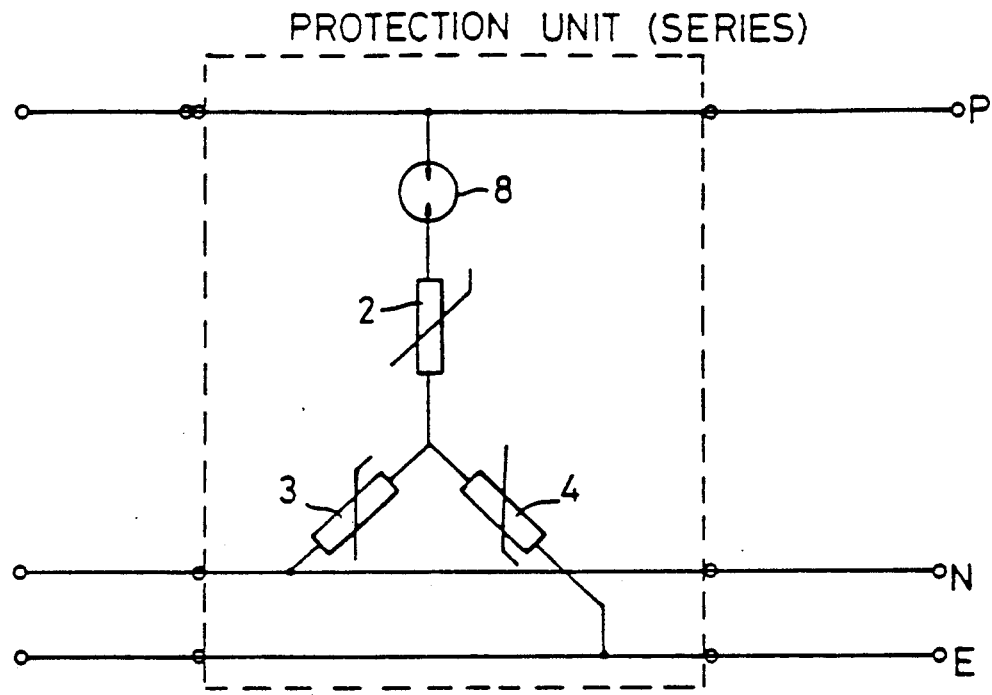
FIGS. 6 and 7 are circuit diagrams showing, respectively, series and parallel devices embodying the invention.

A network device of the type shown in FIG. 5 is shown in FIG. 6 connected in series in the live, neutral, and earth conductors P, N, E as outlined above. In this device the varistor 2 has a voltage rating of 60 volts and the varistors 3, 4 each have voltage ratings of 130 volts. Thus, in use, a transient between the live conductor P and either of the neutral or earth conductors N, E exceeding about 500-600 volts will cause the gas discharge tube 1 to become conducting and the transient will be discharged through the varistors 2, 3 or 2, 4 respectively. Should a transient arise between the neutral and earth conductors exceeding about 260 volts, this will be discharged through the varistors 2, 4.

Figure 7:
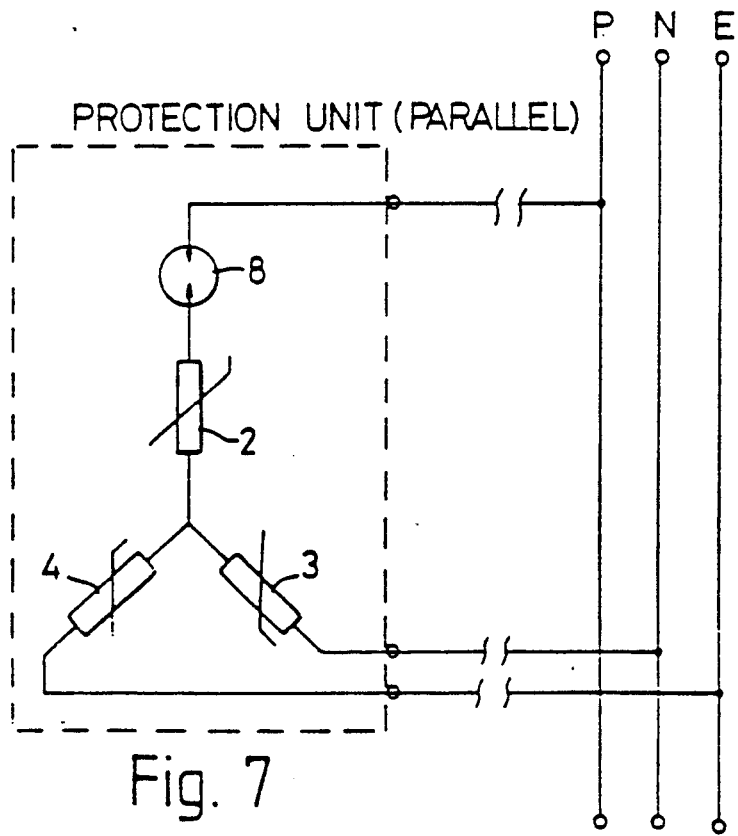

FIG. 7 shows a similar device but in a parallel configuration.

Instead of the device shown in FIG. 5 devices as shown in any of FIGS. 1, 3 or 4 may be used to achieve similar effects.

In practice, the current carrying capacity of the varistors 2, 3, 4 is restricted. A transient of large amplitude will cause large currents to flow through the varistors 2, 3, 4. The voltage across these devices will rise to an unacceptable high level to provide adequate protection for some load installations.

Figure 2:
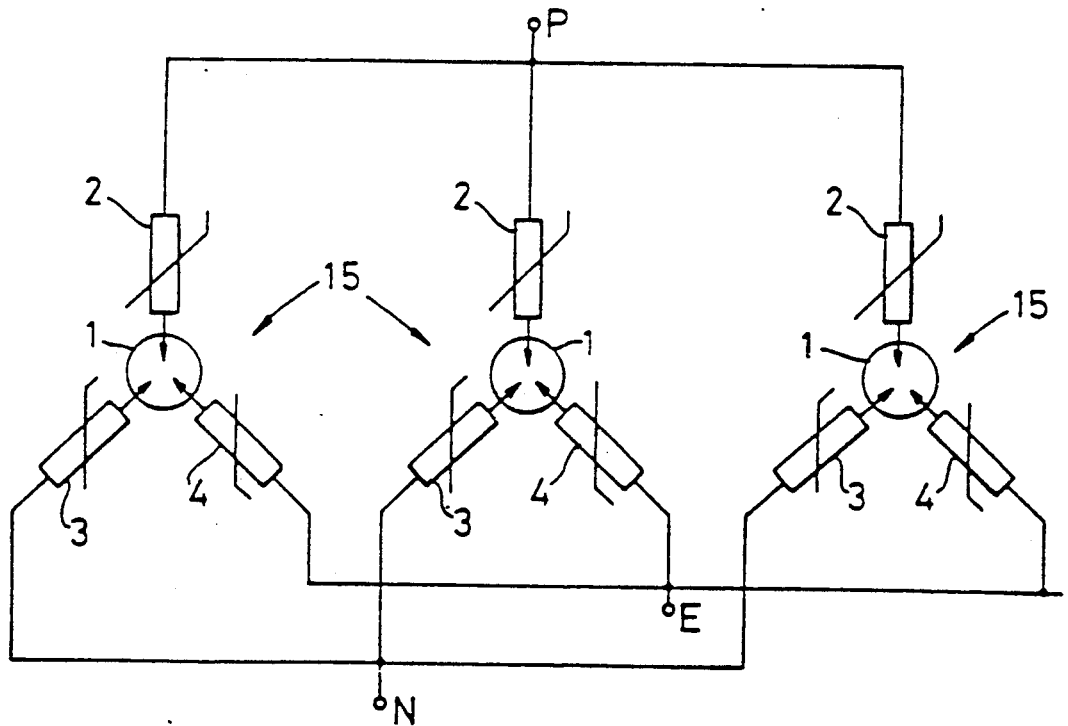
FIG. 2 is a circuit diagram of one apparatus embodying the invention.

In order to provide superior protection, a first illustrative apparatus, for example, as shown in FIG. 2, comprises a cascade arrangement of similar devices, for example the device shown in FIG. 1: such a cascade apparatus is capable of diverting larger transient currents than a single circuit, whilst maintaining a low transient over-voltage reaching any load installation. Such a preferred apparatus is shown in Fig. 2 comprising three protection devices 15 as shown in FIG. 1. In use, when a transient over-voltage arises between the live conductor P and one or both of the neutral and earth conductors N, E, the transient will initially cause the discharge tube 1 of one of the three devices 15 to become conductive and current will flow through the varistors in series with the tube 1, discharging the current associated with the transient voltage. However, in some cases the operation of any one of the devices will not be sufficient to limit the transient overvoltage and the potential difference between the live conductor P and the other conductors N, E will continue to increase: if this occurs, and sufficient current flows, the voltage will cause the tube 1 of a second of the devices to become conductive and if a rise continues then the third device will finally become operational. It has been found that three such devices are sufficient to provide adequate protection to load installations, limiting transients to less than 700 volts reaching the load installations in 240 volt A.C. mains supplies. However, if greater protection is required then it would, of course, be possible to include further devices in the cascade arrangement. In practice best performance is achieved if all the sub-circuits (and each of the devices in the preferred apparatus comprising a cascade of devices) are substantially identical.

Although apparatus as shown in FIG. 2 comprising a simple cascade of devices of the type shown in for example FIGS. 1, 3, 4 or 5, is satisfactory for dealing with transient over voltages on the mains supply which may arise for example from lightning strikes, some transients e.g. switching transients, are of much shorter duration and the voltage rise is often more rapid. As the gas dicharge tubes 1, 8 have a finite transition time required to change from the non-conductive to the conductive state there is a risk that the discharge tubes 1, 8, may not become conductive sufficiently rapidly to deal with some transients adequately.

Figure 8:
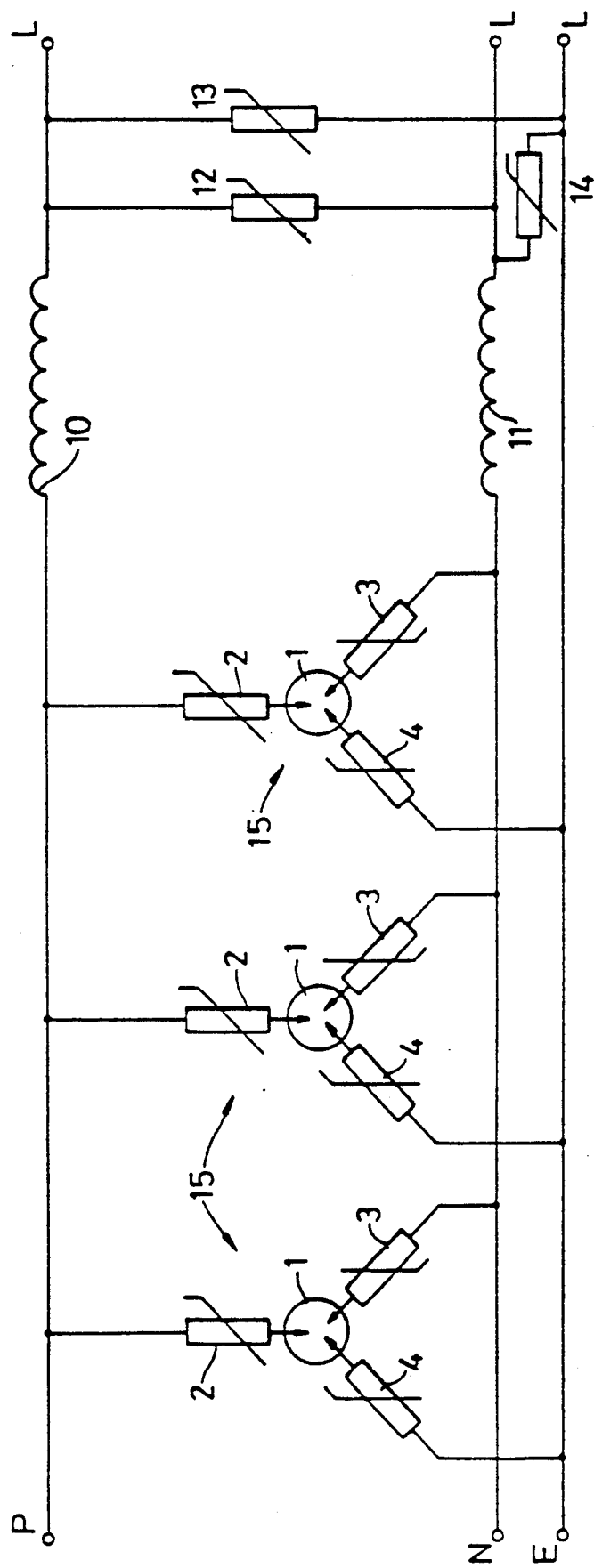
FIG. 8 is a circuit diagram of a second apparatus embodying the invention.

Accordingly, a second preferred apparatus is shown in FIG. 8. This, likewise, comprises a cascade of devices of the type described with reference to FIG. 1 which may, however, instead utilise devices of the type shown in either FIGS. 3, 4 or 5 if desired. In this second illustrative apparatus inductances 10, 11 are included in the live and neutral conductors P, N respectively between the cascade of protective devices and the load installation to which the conductors are connected at the point indicated L. By suitably selecting the value of the inductances 10, 11 an electrical transient over voltage will meet a high impedance at the inductances 10, 11 and the flow of unwanted current towards the load installation L will be deterred; furthermore, the voltage which will be developed across the inductances 10, 11 will encourage the gas discharge tubes 1 to become conductive and to discharge the transient as described previously.

Futhermore varistors 12, 13, 14 are disposed between the live and neutral, the lives and earth and the neutral and earth conductors respectively to further assist in discharging any transient over voltages which pass the inductances 10, 11, the varistors 12, 13, 14 providing a low impedance path for the transient during the time taken for the devices 15 to become conductive. For example, transient reaching the inductances 10, 11 will rapidly induce a higher potential difference between the live and neutral conductors P, N upstream of the inductances 10, 11 of for example 1500 volts, thus causing the cascade of devices to become operational more quickly than would otherwise be the case.

The second illustrative apparatus, shown in FIG. 8 where the varistors 2, 3, 4 are rated at 95 volts could reduce a 6000 volt transient depicted in international standards to under 600 volts.

If the inductances 10, 11 were to be omitted from the circuit of FIG. 8, a slight reduction in performance for fast transients would arise.

The value of the inductances and the core material in the inductances is selected as necessary to achieve the desired results, the core material being selected to give sufficient heat dissipation as well as the necessary inductance. Suitably the inductances 10 and 11 have a value of 7-10 uH and iron dust core material is preferred. In a 240 volt mains circuit the ratings of the varistors 12, 13, 14 are conveniently 260 volts, and these will perform satisfactorily provided the current reaching them does not exceed a few hundred amps—since the devices 15 will fire before the voltage rises significantly above 500 volts this will not occur.

The illustrative apparatuses give improved protection to load installations against transient over voltages and can reduce high energy transients to an over-voltage level lower than heretofore possible using varistor technology alone. Further this is achieved without any substantial leakage of current between the phase and neutral or earth conductors and at relatively low cost by comparison with previous proposals. The combination of relatively low rating varistors and gas discharge tubes is relatively inexpensive and more effective than previous apparatusesfor achieving the same purpose.

Although the illustrative apparatuses are concerned with single phase supplies, similar principles may be used to protect mult-phase mains supplies by appropriate connection of gas discharge tube/varistor devices between the various phases.

Figure 9:
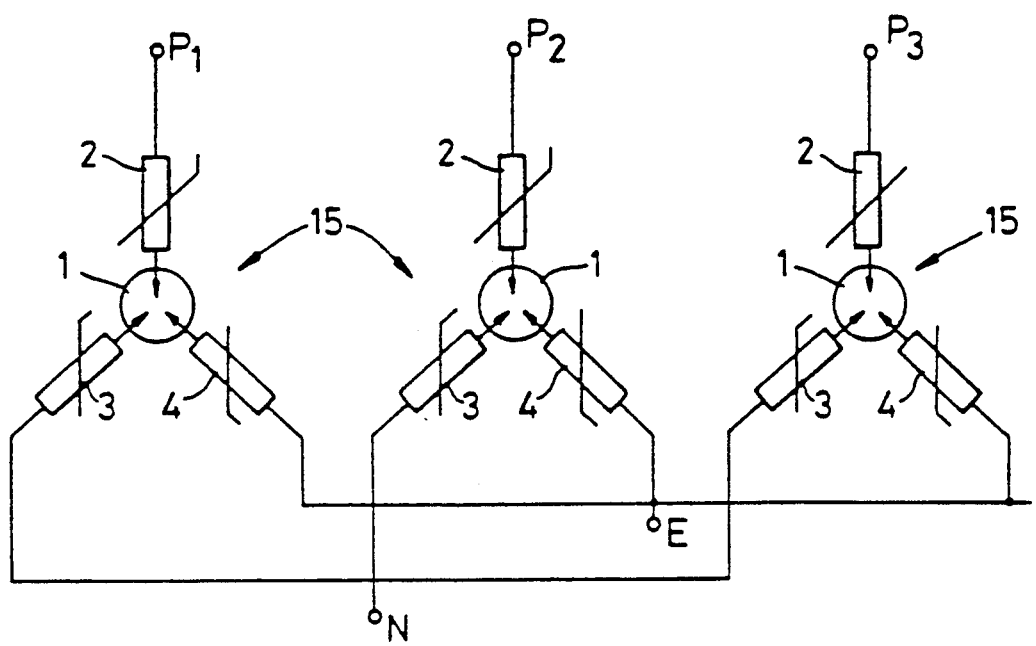
FIG. 9 is a circuit diagram of a third apparatus embodying the invention for use with a three-phase power supply.

The third illustrative apparatus (see FIG. 9) is arranged to protect a three-phase supply having three live conductors P1, P2, P3, and comprising three identical devices 15 as described previously, one associated with each phase. Thus the varistors 3, 4 of each of the three devices 15 are connected to the neutral and earth lines N,E respectively, whilst the varistors 2 are connected to the associated one of the live conductors P1, P2, P3. Of course, instead of using a single device 15 to protect each phase, three apparatuses embodying the invention each comprising a cascade of devices (for example as described herein with reference to FIG. 2, or to FIG. 8) may be used, one such apparatus being associated with each live conductor P1, P2, P3. Any phase/phase transients will be discharged via earth and/or neutral conductors and the relevant devices 15.

I claim:

1. A device suitable for use in protecting electrical installations from transients comprising a network including a plurality of voltage dependent resistors connected to a live conductor, an earth conductor and a neutral conductor, and a single gas discharge tube disposed so that there can be no connection between the live conductor and the neutral and earth conductors other than through the gas discharge tube.

2. A device according to claim 1 wherein the gas discharge tube is a threepole gas discharge tube, each pole having a terminal of one of the voltage dependent resistors connected to it, the other terminal being adapted to be connected to an associated one of the conductors.

3. A device according to claim 1 wherein the network is a star network wherein each of the voltage dependent resistors is associated with a corresponding one of the conductors, and further wherein each of the resistors has one terminal connected in common and an other terminal connected to the associated one of the conductors, the voltage dependent resistor associated with the live conductor being connected to a pole of the gas discharge tube, another pole of which is connected to the live connector.

4. A device according to claim 1 wherein the networks comprises a first one of the voltage dependent resistors connected between the neutral and earth conductors, a second one of the voltage dependent resistors connected between earth and a first pole of the gas discharge tube, and a third one of the voltage dependent resistors connected between neutral and a second pole of the gas discharge tube.

5. A device according to claim 4 wherein the first pole and the second pole are the same pole of the gas discharge tube.

6. A device according to claim 4 wherein the gas discharge tube has three poles of which an associated first one is connected to the live conductor, a second one to the voltage dependent resistor connected to the earth conductor and a third one to the voltage dependent resistor connected to the neutral conductor.

7. A device according to claim 1 wherein the total voltage ratings of the voltage dependent resistors connected between the earth and neutral conductors is substantially equal to the root mean square voltage between the live conductor and the neutral conductor.

8. A device according to claim 1 wherein the total voltage rating of the voltage dependent resistors connected between the live and earth or neutral conductors is sufficiently high that, after a transient has passed, the discharge tube ceases to conduct.

9. Apparatus for use in protecting electrical installations comprising a plurality of devices, wherein each of the devices comprises a network of a plurality of voltages dependent resistors connected to a live conductor, an earth conductor, and a neutral conductor, and a gas discharge tube being disposed so that there can be no connection between the live conductor and the neutral and earth conductors other than through the ags discharge tube.

10. Apparatus suitable for use in protecting electrical installations in accordance with claim 9 further comprising inductances connected in series in the live and neutral conductors between the devices and the installations to be protected, a voltage dependent resistor connected between the live and neutral conductors positioned between the inductances and a load, and voltage dependent resistors connected between the earth conductor and the live and neutral conductors at a position between the live and neutral conductors at a position between the respective inductances and the load.

* * * * *